March 10, 1931. H. W. COWAN 1,796,141
PROCESS FOR DRYING LUMBER AND OTHER MOISTURE CONTAINING MATERIALS
Filed April 16, 1928
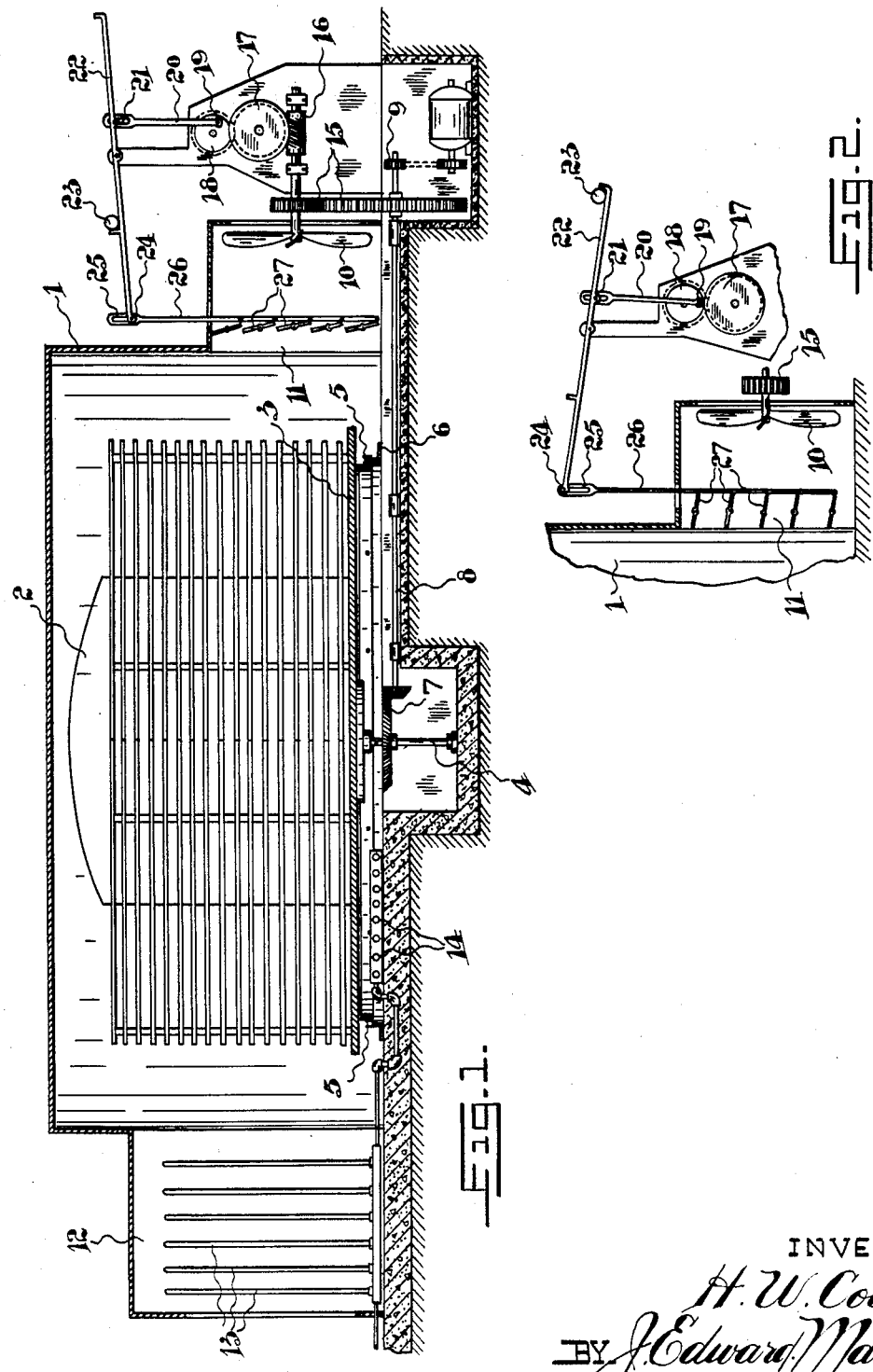
INVENTOR.
H. W. Cowan
BY J. Edward Marlee
ATTY.

Patented Mar. 10, 1931

1,796,141

UNITED STATES PATENT OFFICE

HENRY W. COWAN, OF TORONTO, ONTARIO, CANADA

PROCESS FOR DRYING LUMBER AND OTHER MOISTURE-CONTAINING MATERIALS

Application filed April 16, 1928, Serial No. 270,437, and in Canada September 23, 1927.

This invention relates to a process and an apparatus particularly adapted for the drying of lumber or other moisture containing materials liable to be damaged by ordinary drying processes when conducted too rapidly or at too high a temperature. I have ascertained that high temperatures can be used in drying such materials provided the application of the high temperature is for a limited period of time and if the material be given an opportunity of slightly cooling before being again subjected to the higher temperature.

The process briefly outlined above may be carried out by means of the apparatus described and illustrated in the accompanying drawings in which Fig. 1 is a longitudinal section of a drying kiln constructed in accordance with my invention;

Fig. 2 a side elevation, partly in section, of the apparatus for controlling the operation of the exhaust fan, the parts being shown in the position they assume when the fan is rendered operative.

In the drawings like numerals of reference indicate corresponding parts in the different figures.

1 is a closed chamber provided with a door
2 through which the material to be dried may be introduced into the kiln. While the material may be carried by trucks adapted to be run into the kiln as is common in the art, I prefer to so support the material that it may be kept in motion during the drying operation. For this purpose I provide the turn-table 3 secured to the vertical drive shaft 4 and supported by means of rolls 5 on the circular track 6. This shaft is driven by means of the bevel gearing 7 from a shaft 8, on which is mounted the driving pulley 9. The suction fan 10 has its inlet 11 communicating with the interior of the chamber 1 at one end thereof. At the opposite end of the chamber is located the air inlet conduit 12, in which are located steam coils 13 adapted to heat the entering air. In the chamber 1 are located the steam coils 14. The fan 10 is driven by means of the gearing 15 from the shaft 8.
The mode of operation of the device is as follows: The material to be dried is piled on the turn-table in such a way as to leave suitable interstices for the passage of air. After the door is closed the fan 10 is set in operation and rapidly draws out the air in the chamber. The dry entering air is heated by the steam coils 13, preferably to the highest temperature which it is expected to attain during he drying operation, say 200° Fah. After the original air has been exhausted and replaced by the hot, dry air, the fan is stopped. The air in the chamber, owing to the evaporation of the moisture from the material therein, immediately drops in temperature, probably from 20 to 30°. Owing to the presence of the steam coils 14 in the chamber, the temperature of the air soon begins to rise and finally reattains substantially the temperature at which it entered. As soon as this takes place, the fan 10 is again set in motion and the hot moisture laden air withdrawn and replaced by warm, dry air passing in through the conduit 12 over the steam coils 13. The timing of the changing of the air must be such that the lumber does not remain exposed to the maximum temperature for a sufficient length of time to cause injury.

While the fan may be controlled either manually or automatically according to the temperature, I find that for practical purposes it is sufficient to provide means whereby the fan is non-operative for a predetermined period and is then rendered operative for a similar period of time. For this purpose I may employ the following mechanism. On the fan shaft is secured a worm 16, which meshes with a worm wheel 17 which drives a gear wheel 18 carrying a crank pin 19 journalled in the lower end of the link 20. The upper end of this link is slotted to embrace the pin 21 extending from one side of the rocking beam 22, on which a weight 23 is adapted to roll or slide from one end to the other. One end of the rocking beam is provided with a pin 24 movable in a slot 25 in a vertical rod 26 pivotally connected with pivoted dampers 27 in the inlet 11 of the fan. In Fig. 1 the dampers are shown closed. As the gear wheel 18 carrying the crank pin 19 revolves, the link 20 is raised and the lower end of the slot therein engages the pin 19. The rocking beam 22 is rocked sufficiently to cause the weight to roll to the other end of the rocking beam, thus causing the rocking beam to rock to its limit, as shown in Fig. 2. The pin 24 in this operation first moves to the upper end of the slot 25 and then by its engagement with the end of the slot causes the rod 26 to open up the dampers. The reverse movement will be readily understood from an inspection of the drawings.

It follows from this construction that the fan is rendered operative to change the air in the chamber 1 at predetermined intervals, which intervals can be varied by changing the gear ratio between the fan shaft and the gear wheel 18 carrying the crank pin 19.

Any other mechanism for rendering the fan inoperative at regular intervals might be substituted for that described.

It will also be evident that during the time the lumber is in the drying chamber it is in motion, so that the possibility of saturated air accumulating in the interstices of the material while the remaining air in the chamber is incompletely saturated is entirely avoided.

What I claim is:

A process of drying lumber and other moisture containing materials which consists in placing the material in a chamber; heating the air in said chamber to a temperature capable of damaging the material if its exposure to said temperature is prolonged; periodically removing hot moisture laden air while simultaneously admitting dry air to cause periodical reductions in temperature to below the damaging point through the absorption of moisture from said material by the newly admitted dry air; and then heating the newly admitted air in the chamber to bring it to the aforesaid high temperature.

Signed at Toronto, Canada, this 10th day of April, 1928.

HENRY W. COWAN.